United States Patent
Walker et al.

(10) Patent No.: US 9,143,910 B2
(45) Date of Patent: Sep. 22, 2015

(54) METHOD AND SYSTEM FOR REMOTE WIPE THROUGH VOICE MAIL

(75) Inventors: David Ryan Walker, Waterloo (CA); Steven Henry Fyke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/249,849

(22) Filed: Sep. 30, 2011

(65) Prior Publication Data

US 2013/0084846 A1    Apr. 4, 2013

(51) Int. Cl.
- *H04M 3/00* (2006.01)
- *H04W 4/16* (2009.01)
- *H04W 12/08* (2009.01)
- *H04W 12/12* (2009.01)

(52) U.S. Cl.
CPC .............. *H04W 4/16* (2013.01); *H04W 12/08* (2013.01); *H04W 12/12* (2013.01)

(58) Field of Classification Search
USPC ............. 455/419, 410, 420, 438, 411; 726/29
See application file for complete search history.

(56) References Cited

U.S. PATENT DOCUMENTS

| | | | |
|---|---|---|---|
| 6,266,400 B1 * | 7/2001 | Castagna | 379/88.25 |
| 6,453,029 B1 * | 9/2002 | Campbell | 379/114.2 |
| 7,707,639 B2 | 4/2010 | Brown et al. | |
| 8,073,427 B2 * | 12/2011 | Koch et al. | 455/411 |
| 8,165,576 B2 * | 4/2012 | Raju et al. | 455/422.1 |
| 2002/0152401 A1 | 10/2002 | Zhang et al. | |
| 2003/0059000 A1 | 3/2003 | Burton et al. | |
| 2004/0117310 A1 * | 6/2004 | Mendez et al. | 705/50 |
| 2004/0267944 A1 * | 12/2004 | Britt, Jr. | 709/229 |
| 2004/0268073 A1 * | 12/2004 | Morisawa | 711/164 |
| 2005/0020315 A1 | 1/2005 | Robertson | |
| 2005/0186954 A1 | 8/2005 | Kenney | |
| 2005/0191988 A1 | 9/2005 | Thornton et al. | |
| 2005/0221799 A1 | 10/2005 | Tervo et al. | |
| 2005/0240672 A1 * | 10/2005 | Chen et al. | 709/229 |
| 2006/0083357 A1 | 4/2006 | Howell et al. | |
| 2006/0172730 A1 * | 8/2006 | Matsuda | 455/420 |
| 2006/0277590 A1 | 12/2006 | Limont et al. | |
| 2007/0006289 A1 | 1/2007 | Limont et al. | |
| 2007/0118558 A1 | 5/2007 | Kahandaliyanage | |
| 2007/0178881 A1 * | 8/2007 | Teunissen et al. | 455/410 |
| 2007/0249322 A1 * | 10/2007 | Benco et al. | 455/410 |
| 2007/0275720 A1 * | 11/2007 | Dei et al. | 455/435.2 |
| 2007/0281664 A1 * | 12/2007 | Kaneko et al. | 455/410 |
| 2007/0281680 A1 * | 12/2007 | Raju et al. | 455/422.1 |

(Continued)

FOREIGN PATENT DOCUMENTS

| | | |
|---|---|---|
| EP | 1503604 A2 | 2/2005 |
| EP | 1659818 | 5/2006 |

(Continued)

OTHER PUBLICATIONS http://www.mobivox.com/how-to-call/,as captured by Archive.org Oct. 11, 2007.

(Continued)

*Primary Examiner* — Kashif Siddiqui
*Assistant Examiner* — Mong-Thuy Tran
(74) *Attorney, Agent, or Firm* — Moffat & Co.

(57) ABSTRACT

A method and system for remotely wiping a mobile device, the method receiving, at a telephonic server hosting a telephonic menu, a selection to wipe data and connections from the mobile device; and forwarding a wipe data request to a network server to send a wipe command.

22 Claims, 4 Drawing Sheets

(56) References Cited

U.S. PATENT DOCUMENTS

| | | |
|---|---|---|
| 2007/0298767 A1 | 12/2007 | Brown et al. |
| 2008/0005561 A1* | 1/2008 | Brown et al. ............... 713/164 |
| 2008/0008163 A1* | 1/2008 | Castell et al. ............... 370/352 |
| 2008/0132257 A1* | 6/2008 | Fok et al. ..................... 455/466 |
| 2008/0148042 A1* | 6/2008 | Brown et al. ............... 713/154 |
| 2008/0172744 A1* | 7/2008 | Schmidt et al. ............... 726/26 |
| 2008/0178300 A1* | 7/2008 | Brown et al. ............... 726/29 |
| 2008/0186162 A1 | 8/2008 | Ranjan et al. |
| 2008/0274723 A1* | 11/2008 | Hook et al. ............... 455/419 |
| 2008/0313707 A1* | 12/2008 | Jain et al. ..................... 726/2 |
| 2009/0068987 A1* | 3/2009 | O'Neil et al. ............... 455/411 |
| 2009/0110156 A1* | 4/2009 | Hosteny et al. ............... 379/85 |
| 2009/0265552 A1* | 10/2009 | Moshir et al. ............... 713/168 |
| 2010/0115092 A1* | 5/2010 | Westin ..................... 709/224 |
| 2010/0128291 A1* | 5/2010 | Vendrow et al. ............... 358/1.9 |
| 2010/0169979 A1 | 7/2010 | Brown et al. |
| 2010/0197351 A1* | 8/2010 | Ewell et al. ............... 455/565 |
| 2010/0210240 A1* | 8/2010 | Mahaffey et al. ............... 455/411 |
| 2010/0251144 A1* | 9/2010 | Shaty ..................... 715/760 |
| 2010/0279652 A1* | 11/2010 | Sharp et al. ............... 455/410 |
| 2010/0279675 A1* | 11/2010 | Slack et al. ............... 455/419 |
| 2010/0283679 A1* | 11/2010 | Levy et al. ............... 342/357.49 |
| 2010/0299523 A1* | 11/2010 | Henry et al. ............... 713/168 |
| 2011/0004941 A1* | 1/2011 | Mendez et al. ............... 726/26 |
| 2011/0145927 A1 | 6/2011 | Hubner et al. |
| 2011/0207433 A1* | 8/2011 | Miyamoto ..................... 455/411 |
| 2011/0218965 A1* | 9/2011 | Lee et al. ..................... 707/640 |
| 2011/0270918 A1* | 11/2011 | Benenson ..................... 709/203 |
| 2011/0281563 A1* | 11/2011 | Erb ..................... 455/414.1 |
| 2011/0302630 A1* | 12/2011 | Nair et al. ..................... 726/4 |
| 2011/0317685 A1* | 12/2011 | Torgersrud et al. ............ 370/352 |
| 2011/0319056 A1* | 12/2011 | Toy et al. ..................... 455/412.2 |
| 2012/0054841 A1* | 3/2012 | Schultz et al. ..................... 726/6 |
| 2012/0072979 A1* | 3/2012 | Cha et al. ..................... 726/7 |
| 2012/0202462 A1* | 8/2012 | Sudhakar ..................... 455/411 |
| 2012/0210389 A1* | 8/2012 | Brown et al. ..................... 726/1 |
| 2012/0240238 A1* | 9/2012 | Gates et al. ..................... 726/26 |
| 2012/0244839 A1* | 9/2012 | Shen ..................... 455/411 |
| 2012/0302204 A1* | 11/2012 | Gupta et al. ..................... 455/406 |

FOREIGN PATENT DOCUMENTS

| | | |
|---|---|---|
| WO | 01/50720 A1 | 7/2001 |
| WO | 2005/107282 | 11/2005 |
| WO | 2011/091538 | 8/2011 |

OTHER PUBLICATIONS http://www.apple.com/iphone/business/integration, as captured by Archive.org Aug. 25, 2011—pls refer to "Secure your data." subsection of that webpage.

European Search Report, EP Application 11183632, Mailed May 24, 2012.

Canadian Intellectual Property Office, Office Action, Application No. 2791011, Oct. 7, 2014.

* cited by examiner

METHOD AND SYSTEM FOR REMOTE WIPE THROUGH VOICE MAIL

FIELD OF THE DISCLOSURE

The present disclosure relates to mobile devices and in particular to security for mobile devices.

BACKGROUND

One security feature on some mobile devices involves remotely wiping data and data connections from the device if the device is lost or stolen. This is typically done by an Information Technology (IT) Administrator for an enterprise using an enterprise server to send a remote wipe command from the enterprise server to the lost or stolen mobile device. The lost of stolen mobile device includes software or an application module which recognizes the remote wipe command and will proceed to remotely wipe the data and connections currently stored on the mobile device.

BRIEF DESCRIPTION OF THE DRAWINGS

The present disclosure will be better understood with reference to the drawings, in which.

DETAILED DESCRIPTION OF THE DRAWINGS

The present disclosure provides a method for remotely wiping a mobile device comprising: receiving, at a telephonic server hosting a telephonic menu, a selection to wipe data and connections from the mobile device; and forwarding a wipe data request to a network server to send a wipe command.

The present disclosure further provides a system for remotely wiping a mobile device comprising: a telephonic server hosting a telephonic menu, the telephonic server configured to receive a selection to wipe data and connections from the mobile device; and a network server communicating with the telephonic server, the network server configured to: receive and verify a wipe data request from the telephonic server; and send a wipe command from the network server to the mobile device.

If a mobile device is lost or is stolen, a user may not know the appropriate number to call or how to initiate a remote wipe through an Information Technology department of the user's enterprise. Further, a remote wipe may not be possible through a carrier or service provider. In order to overcome the above limitations, a remote wipe feature may be made available by calling a number that a user would know.

One problem with remote wiping through an Information Technology department is that a user may not know the appropriate number to call to initiate the wipe. Typically, the mobile device may store a directory of relevant numbers and, if it is lost or stolen, the user may not have this directory. Further, it may be difficult or impossible to reach an Information Technology Administrator in the evening or on weekends to wipe the device and thus the remote wipe may need to wait until the next weekday, which may compromise data security.

Further, some mobile devices do not operate through an enterprise server and instead utilize a device server hosted by a carrier or service provider for data on the device. In this case, it may be impossible to start a remote wipe procedure on the device.

Thus, in one embodiment, the number called comprises the number of the lost device. Typically, a user will know his or her mobile phone number and in many networks this remote number provides access to the mobile user's voicemail directory.

In other embodiments, the user may call his or her work telephone number to access a corporate voicemail system. Similarly, in other embodiments there are telephone numbers that a user would typically know which may be used to access a directory and would be within the scope of the present disclosure.

A mobile device may be used for a variety of functions. Typically, mobile devices are no longer only used for accessing a cellular network for voice communications, but rather have been used as personal digital assistants, messaging devices, calendar devices, camera devices, gaming devices, e-reader devices, media player devices, web browser devices, others, and therefore store a variety of data. Content on the phone can include contacts, recent emails, memos, documents, financial records, among other data that may be considered to be sensitive by the user of the device. If a device is lost or stolen, such data may become compromised and one security feature possible is the capability of remotely wiping the mobile device.

Remotely wiping the device deletes data and also typically deletes contacts or connections to various email boxes to prevent future release of data onto the device. In one embodiment, a remote wipe will restore factory defaults onto the device and thus the device will have no data nor any connections to synchronize with any email boxes, calendars, memos, applications among other features.

In order to implement prior solutions, the IT Administrator needs to be contacted to send the kill packet.

According to the present disclosure, a wipe may be initiated by entering a known number and accessing a menu which would include the ability to wipe the device. In one embodiment, the number received may be the telephone number of the mobile device and the caller may thereby access the voicemail system for the mobile device. In other embodiments a text message could be sent to the voicemail server if the voicemail server supports such messaging. In this case the text message could include authentication information that the voicemail server could verify prior to wiping the device. In other embodiments, the text message with the wipe command could be sent to the device itself.

In other embodiments, other numbers may be used, including a business number to access a corporate voicemail system. This may be advantageous in cases where an enterprise server is used to manage the data on the device.

Other options for telephone numbers are within the scope of the present disclosure.

Figure 1:
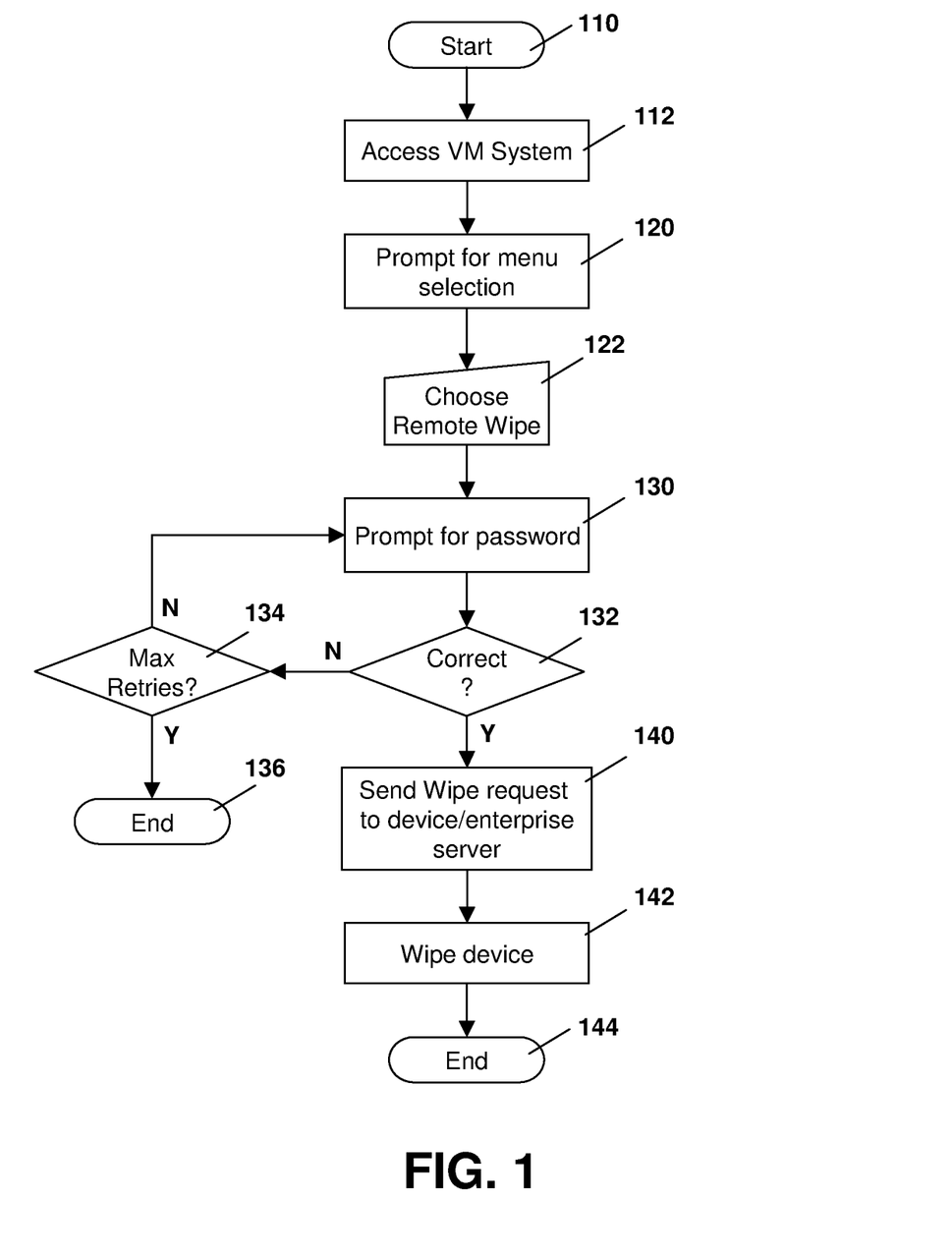
FIG. 1 is a process diagram of a method in accordance with the present disclosure.

Reference is now made to FIG. 1, which shows a process diagram that starts at block 110 and proceeds to block 112. In block 112, the user accesses a voicemail system. For example, many service providers allow the remote access of a voicemail system by connecting to a voicemail system by dialing a number of the device and then pressing a certain key such as the "*" key to access the voicemail system. A prompt may then be provided for a password to enter into the voicemail system.

Once the voicemail system for the device has been successfully accessed, the process proceeds to block 120 in which a menu selection is provided. This telephonic menu may provide prompts, for example, press "1" to listen to new messages, press "2" to change your administrative options, etc. In accordance with the present disclosure, a new menu item, such as "press 5" to remotely wipe your device, may be provided.

In some cases, the selection of the option to remotely wipe the device may provide a prompt for which device should be wiped if more than one device is registered with the voicemail. In other embodiments, the phone number used to access the voicemail system may relate to only one mobile device.

In block 122, the remote wipe for the device is selected and the process proceeds to block 130.

Block 130 is an optional block but may be used in many cases where an added layer of security may be desired. A prompt is provided for a confirmatory password in block 130 for remote wipe confirmation.

From block 130 the process proceeds to block 132 to check if the password entered at block 130 is correct. The check of block 132 may involve various processes. For example, a password may be set for remote wipe within the voicemail system. Alternately, the password for a remote wipe may be set on the device itself. Thus, the check of block 132 may query an enterprise server or device server to determine whether or not the password is correct. Alternately, the check of block 132 may send a message to the lost or stolen device itself to determine whether or not the password is correct.

From block 132, if the password is not correct the process proceeds to block 134 in which a check is made to determine whether the maximum number of re-tries has occurred. If the password prompt has been provided a certain number of times and has incorrectly been entered then, for security reasons, the process may end. Thus from block 134, if the maximum number of tries has been reached, the process proceeds to block 136 and ends.

Conversely, if the maximum number of re-tries has not been reached, then the process proceeds from block 134 back to block 130 in which a password prompt is again provided.

If, in block 132, it is determined that the password is correct then the process proceeds to block 140. In block 140 a voicemail server or other telephone server may send a wipe request to a device or enterprise server to start the wipe process. Such wipe request could include information identifying the mobile device for which the wipe is to be performed, including the phone number for the mobile device, a PIN for the mobile device, or another phone number or identifier that may be associated with the mobile device.

The process then proceeds to block 142 in which the device or enterprise server sends the wipe or kill packet to the appropriate mobile device.

The process then proceeds to block 144 and ends.

Figure 2:
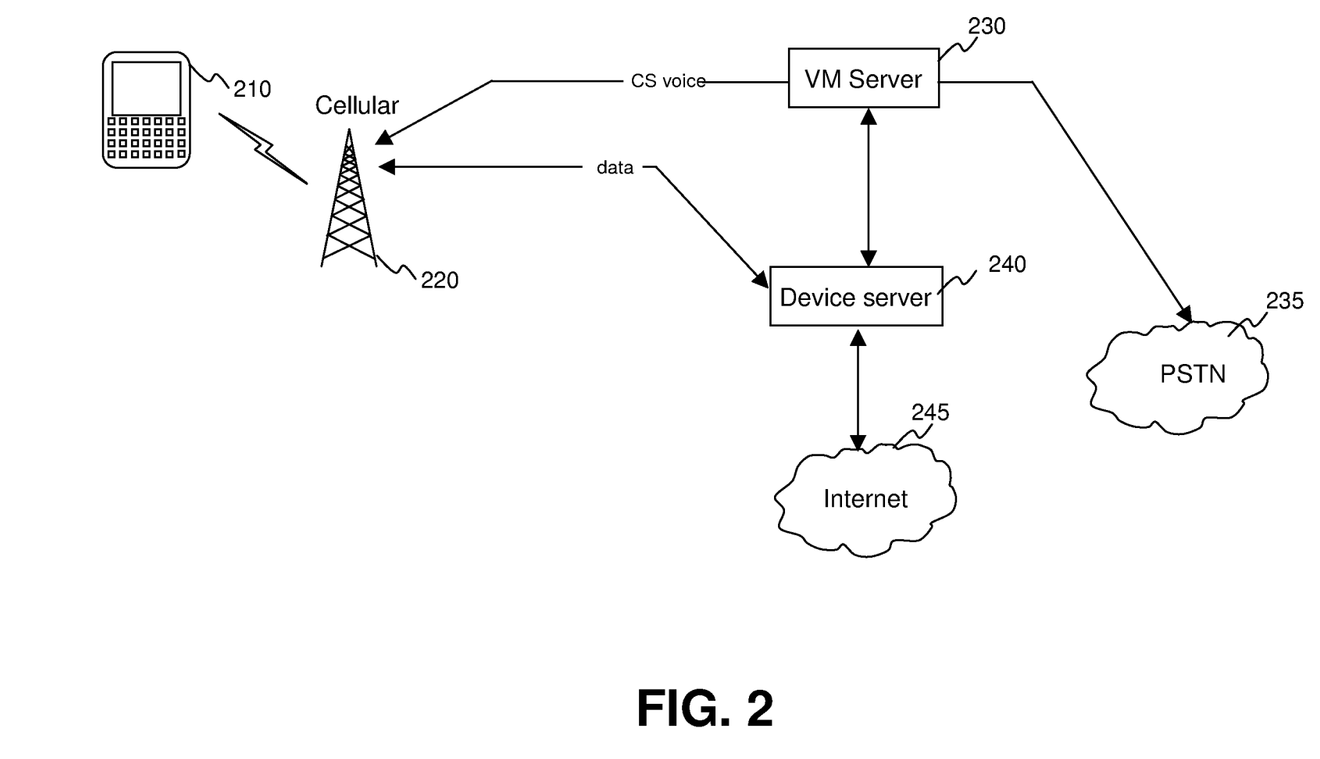
FIG. 2 is a block diagram of a simplified network architecture in accordance with one embodiment of the present disclosure.

Reference is now made to FIG. 2. FIG. 2 shows a simplified mobile architecture in which a carrier includes a device server to manage certain data on the mobile device. The device server may further be enabled to send a remote wipe or kill packet to the device to remotely wipe the device.

In the embodiment of FIG. 2, a mobile device 210 communicates with a cellular network 220 to provide either voice or data services. Various cellular networks exist including, but not limited to, global system for mobile communications (GSM), general packet radio service (GPRS), co-division multiple access (CDMA), universal mobile telecommunication system (UMTS), wideband co-division multiple access (WCDMA), long term evolution (LTE), long term evolution-advanced (LTE_A), among others. These technologies allow the use of voice, data, or both.

A carrier or service provider may have various servers to serve mobile device 210. For example, the carrier or service provider might administer a voicemail server 230 to provide voicemail services for mobile device 210. Voicemail server 230 communicates with device 210 through cellular network 220 and may further communicate with a public switched telephone network (PSTN) 235 to communicate with other devices.

The carrier or service provider may also include a device server 240 that is used to provide data services to mobile device 210. For example, device server 240 may be used to consolidate access to various email accounts for device 210 and may be used to provide a push email service to device 210 based on such email service consolidation.

In one embodiment, device server 240 may further include information such as a personal identification number (PIN) for the device. As such, device server 240 may be capable of sending a kill packet to remotely wipe device 210. Device 210 will, in one embodiment, authenticate the kill packet and proceed to wipe the device in accordance with software on the device.

The device server 240 may communicate with the Internet 245 to provide data access over the Internet.

In one embodiment, the voicemail server 230 can further communicate with the device server 240. In this way, the voicemail server 230 can, once the kill selection is selected and authenticated, send a command to device server 240. Voicemail server 230 may be considered to be a trusted entity by device server 240 to provide security for the wipe command to ensure that such wipe command is authentic.

Figure 3:
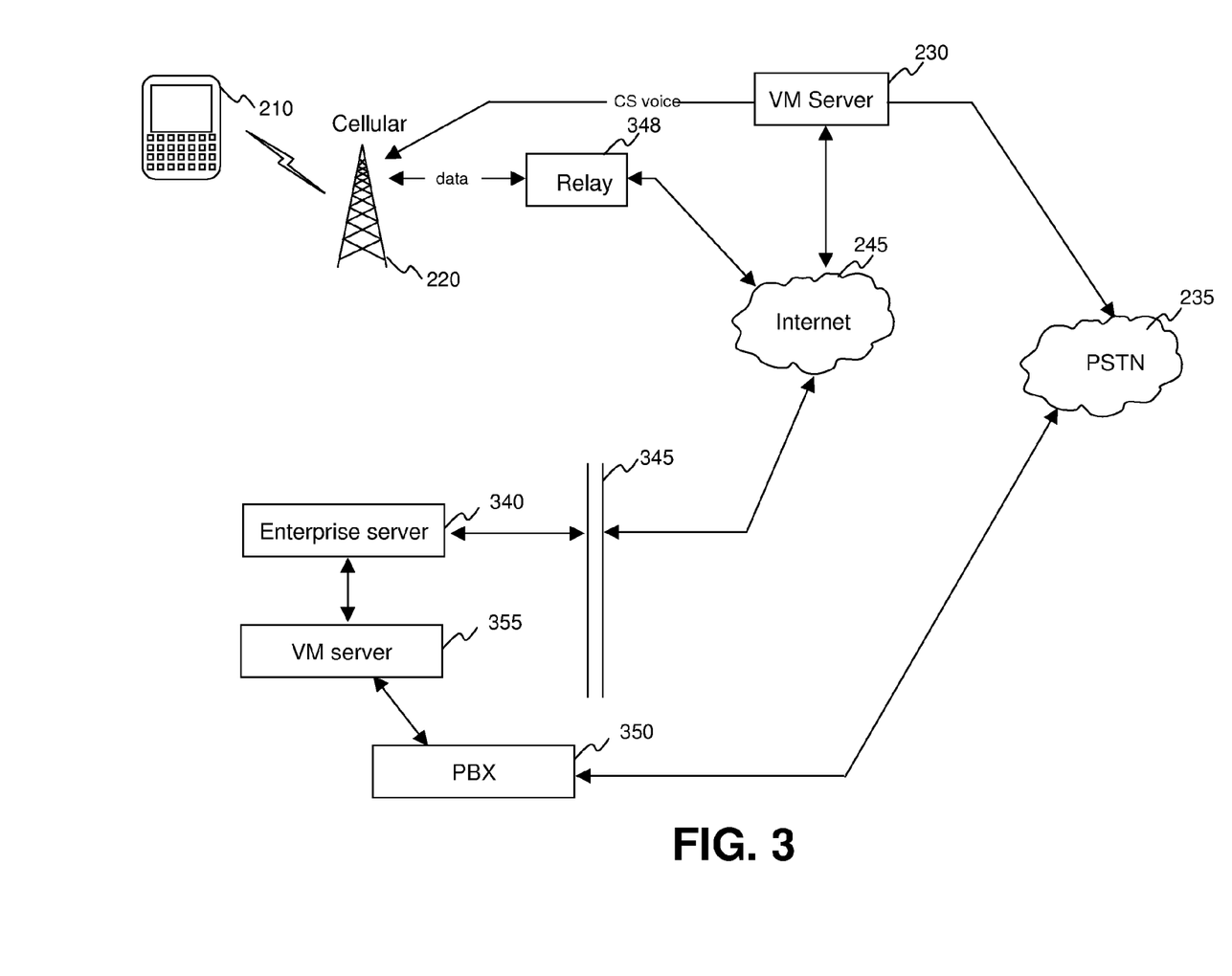
FIG. 3 is a block diagram of a simplified network architecture in accordance with a further embodiment of the present disclosure.

Reference is now made to FIG. 3. FIG. 3 shows an alternative embodiment in which mobile device 210 communicates through a cellular network 220 with a carrier or service provider voicemail server 230.

In the embodiment of FIG. 3, the data for the device is managed through an enterprise server 340. In this case, an enterprise server 340 may be behind a corporate firewall 345. Data is routed through a relay 348, through the Internet 245, through the firewall 345 and to enterprise server 340.

Further, the enterprise may have a private branch exchange (PBX) 350 which operates the telephone system for the enterprise. The PBX may have an internal or external voicemail server 355 which may host the telephonic menu to select a remote wipe.

In the embodiment of FIG. 3, various options are possible for providing a remote wipe to device 210. In one embodiment, a user may dial the voicemail system for the mobile device. In this case, the user may access voicemail server 230 and proceed in accordance with the embodiment of FIG. 1. However, in this case, voicemail server 230 must send a wipe command to enterprise server 340. This may be done in some situations in which enterprise server 340 has granted a trusted entity status to voicemail server 230 to allow such remote wipe commands to be received from the voicemail server 230, or through other handshaking techniques.

If, voicemail server 230 sends a remote wipe command through firewall 345 to enterprise server 340 and enterprise server 340 deems such message to be authentic, enterprise server 340 may then send the remote wipe command to mobile device 210.

In an alternative embodiment, a user may access a voicemail server 355 through the PBX 350. In this case, access may be granted, for example, by dialing the user's business telephone number and accessing the voicemail. The PBX 350 or voicemail server 355 may include a directory and may associate a mobile device with the voicemail for the enterprise. In this case, voicemail server 355 may be a trusted server for enterprise server 340 and thus once a remote wipe menu item has been selected and has been authenticated, voicemail server 355 may send the remote wipe command to enterprise server 340, which can then send a kill packet to mobile device 210. The above therefore provides for various options to use a voicemail system or other telephone menu system in order to provide for the remote wipe of a mobile device.

Voicemail servers 230 and 355, device server 240 and enterprise server 340 typically will include a processor, communications subsystem and memory to provide the above functionality.

Further, voicemail servers 230 and 355 and PBX 350 are referred to herein individually or collectively as a telephonic server. Enterprise server 340 and device server 240 are referred to herein as a network server.

A Carrier Administered Device Example

The above embodiments may be illustrated using an example. In one scenario, a device has been lost at a restaurant. In this case, a restaurant's or a friend's phone may be used to access the device by dialing the number for the device and being prompted to leave a voicemail message. During the prompt, if the "*" key is pressed, a prompt to enter the password for the voicemail system is issued. The password is entered and the voicemail system provides a variety of voicemail options.

The voicemail options presented include listening to new messages, listening to saved messages, administering the voicemail box, among others. The menu prompt also includes the option to remotely wipe the device.

An appropriate key selection is received at the voicemail system to enter the remote wipe system. In one embodiment, this will then wipe the device. However, if additional security is provided entry of a password will be requested to remotely wipe the device.

The password may, for example, comprise a four digit code. The password may, for example, have previously been set when the device was configured or may be set on the device at some point.

If the verification password is verified, the voicemail server then will communicate with the device server or enterprise server in order to send the kill packet to the mobile device. The enterprise server or device server first authenticates that the voicemail server is valid and then sends the kill packet to the PIN for the device. Upon receiving such kill packet, the device recognizes that it is to wipe itself and proceeds to wipe all data and connections for the device, thereby removing any sensitive information or the capability to access any sensitive information.

In alternative embodiments, a text message may be used to provide for remote wiping, for example, by sending a text to the device with a kill code and authentication information.

Enterprise Example

In an alternative embodiment, instead of dialing the voicemail for the device, a company phone number may be dialed to access the company voicemail system. This may be useful, for example, in cases where an enterprise server is administering the data and therefore the kill command for the mobile device. The enterprise server may trust the PBX or corporate voicemail server and it therefore may be more desirable for the IT department to allow the PBX/voicemail server to send such kill commands to the enterprise server.

Once the a voicemail system is accessed in a manner similar to the example above, and upon verification, the command to send a kill command is sent from the PBX to the enterprise server, which then verifies the command and sends the kill packet to the mobile device.

In both examples above, the numbers for a mobile device or enterprise or business are known to owner of the device and can therefore be used to easily access the menus and the option to remotely wipe the device. Further, telephones to access such voicemail systems are widely available and the user would be able to access a telephone relatively easily and quickly to provide such a remote wipe.

While the mobile device that receives the kill packet and performs the remote wipe may be any mobile device, one example mobile device is shown below with reference to FIG. 4.

Figure 4:
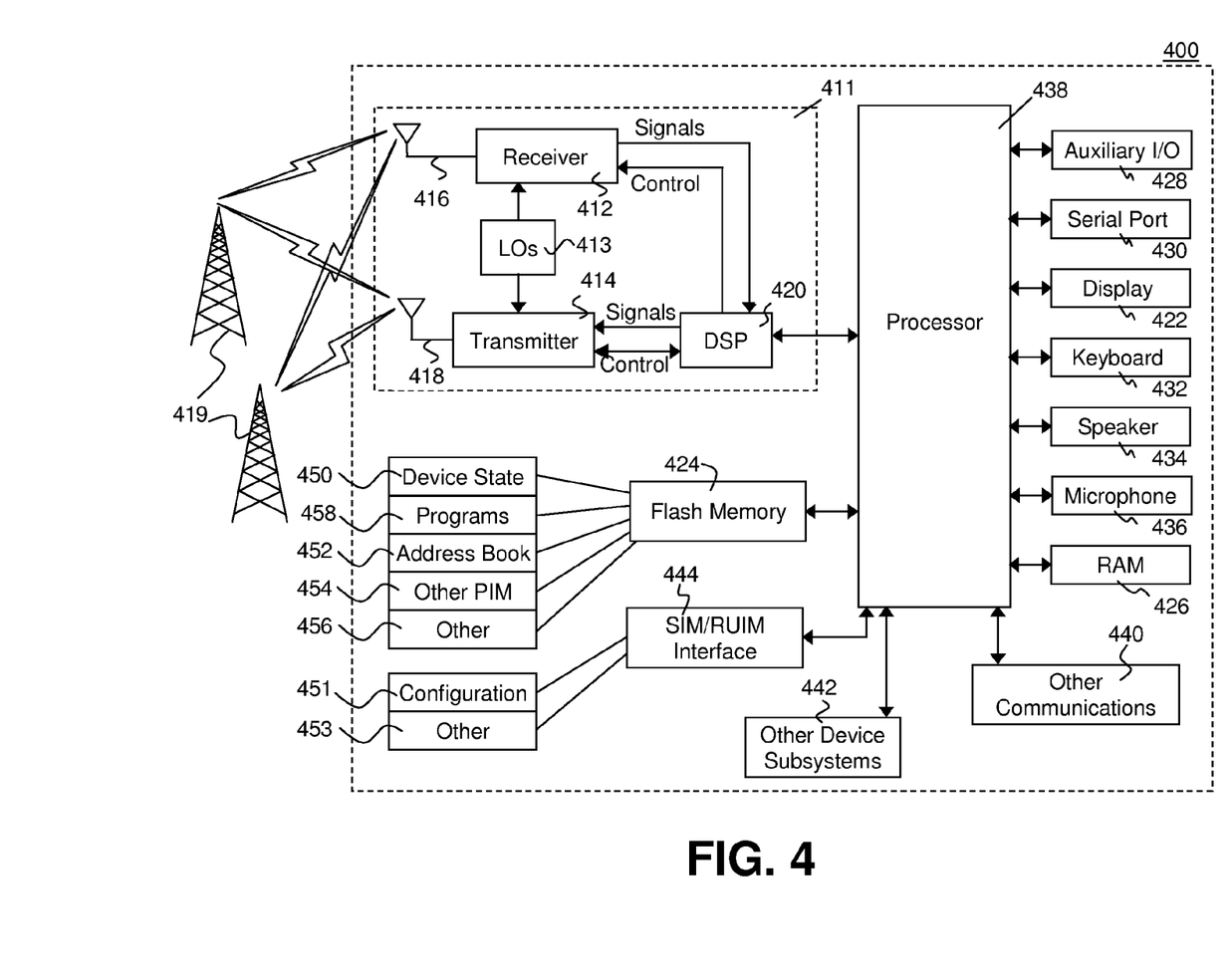
FIG. 4 is a block diagram of an example mobile device capable of being used with the present disclosure.

FIG. 4 shows a block diagram illustrating a mobile device capable of being used with various embodiments of the present disclosure. Mobile device 400 is generally a two-way wireless communication device having at least voice and data communication capabilities. Mobile device 400 may have the capability to communicate with other computer systems on the Internet. Depending on the exact functionality provided, the mobile device may be referred to as a smart phone, a data messaging device, a wireless e-mail device, a cellular telephone, a wireless Internet appliance, or a data communication device, as examples.

Where mobile device 400 is enabled for two-way communication, it will generally incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. The particular design of the communication subsystem 411 will be dependent upon the communication network in which the device is intended to operate.

Network access requirements will also vary depending upon the type of network 419. In some networks network access is associated with a subscriber or user of mobile device 400. A mobile device may provide for a removable user identity module (RUIM) or a subscriber identity module (SIM) card in order to operate on a network. The SIM/RUIM interface 444 is normally similar to a card-slot into which a SIM/RUIM card can be inserted and ejected like a diskette or PCMCIA card. The SIM/RUIM card can have memory and hold key configuration 451, and other information 453 such as identification, and subscriber related information.

When required network registration or activation procedures have been completed, mobile device 400 may send and receive communication signals over the network 419. As illustrated in FIG. 4, network 419 can comprise one or multiple base stations communicating with the mobile device in some embodiments.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 typically includes a processor or microprocessor 438 which controls the overall operation of the device. Communication functions, including at least data and voice communications, are performed through communication subsystem 411. Processor or microprocessor 438 also interacts with further device subsystems such as the display 422, flash memory 424, random access memory (RAM) 426, auxiliary input/output (I/O) subsystems 428, serial port 430, two or more keyboards or keypads 432, speaker 434, microphone 436, other communication subsystem 440 such as a short-range communications subsystem or WiFi or WiMax communications and any other device subsystems generally designated as 442. If other communications 440 are WiFi or WiMAX, the communications utilize a communication subsystem such as communication subsystem 411 to communicate with an access point 470.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 may be stored in a persistent store such as flash memory 424, which may instead be a read-only memory (ROM) or similar storage element (not shown). The operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, may enable execution of software applications on the mobile device. A predetermined set of applications that control basic operations, including data and voice communication applications for example, can be installed on mobile device 400 during manufacturing.

One software application may be a personal information manager (PIM) application having the ability to organize and manage data items relating to the user of the mobile device such as, but not limited to, e-mail, calendar events, voice mails, appointments, and task items. One or more memory stores may be available on the mobile device to facilitate storage of PIM data items. Such PIM application may have the ability to send and receive data items, via the wireless network 419. In one embodiment, the PIM data items are seamlessly integrated, synchronized and updated, via the wireless network 419 or access point 470, with the mobile device user's corresponding data items stored or associated with a host computer system. Further applications may also be loaded onto the mobile device 400 through the network 419 or access point 470, an auxiliary I/O subsystem 428, serial port 430, short-range communications subsystem 440 or any other suitable subsystem 442, and installed by a user in the RAM 426 or a non-volatile store (not shown) for execution by the microprocessor 438. Such flexibility in application installation increases the functionality of the device and may provide enhanced on-device functions, communication-related functions, or both.

In a data communication mode, a received signal such as a text message or web page download is processed by the communication subsystem 411 and input to the microprocessor 438, which then further processes the received signal for output to the display 422, or alternatively to an auxiliary I/O device 428. Mobile device 400 may also be used to compose data items such as email messages for example, using the keyboard 432, may be a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile device 400 is similar, except that received signals would be generally output to a speaker 434 and signals for transmission would be generated by a microphone 436. Alternative voice or audio I/O subsystems, such as a voice message recording subsystem, may also be implemented on mobile device 400. Although voice or audio signal output is usually accomplished primarily through the speaker 434, display 422 may also be used to provide an indication of the identity of a calling party, the duration of a voice call, or other voice call related information for example.

Serial port 430 in FIG. 4, may be implemented in a personal digital assistant (PDA)-type mobile device for which synchronization with a user's desktop computer (not shown). Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. Serial port 430 can further be used to connect the mobile device to a computer to act as a modem or for charging.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices or a radio frequency identifier (RFID) or near field communications (NFC) communication module, etc.

Thus, mobile device 400 can implement the wipe process when a kill packet is received over communications subsystem 411 by using processor 438. Code for the wipe functionality may be store in memory on the device.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for remotely wiping a mobile device comprising:
receiving, at a telephonic server hosting a voicemail system for the mobile device, a selection to wipe data and connections from the mobile device, the voicemail system having a telephonic menu accessible by voice call utilizing a telephone number associated with the mobile device;
prompting, upon receiving the selection, entry of a password;
verifying a received password at the telephonic server; and
forwarding a wipe data request to a network server to send a wipe command, the network server being distinct from the telephonic server and having a trust relationship with the telephonic server to authenticate the wipe data request.

2. The method of claim 1, wherein the voicemail system is hosted by a carrier or service provider.

3. The method of claim 1, wherein the voicemail system is hosted by an enterprise.

4. The method of claim 1, wherein the network server comprises a device server hosted by a carrier or service provider.

5. The method of claim 1, wherein the network server comprises an enterprise server.

6. The method of claim 1, wherein the telephonic server is accessed utilizing a telephone number for the mobile device.

7. The method of claim 1, wherein the telephonic server is accessed utilizing a telephone number associated with a user of the mobile device.

8. The method of claim 7, wherein the telephone number associated with the user of the mobile device is an enterprise telephone number, and wherein the telephonic server is a private branch exchange of the enterprise.

9. A system for remotely wiping a mobile device comprising:
a telephonic server hosting a voicemail system for the mobile device, the voicemail system having a telephonic menu accessible by voice call utilizing a telephone number associated with the mobile device, the telephonic server configured to:
receive a selection to wipe data and connections from the mobile device;
prompt, upon receiving the selection, entry of a password;
verify a received password at the telephonic server; and
a network server distinct from and having a trust relationship with the telephonic server, the network server communicating with the telephonic server, the network server configured to:
receive and authenticate a wipe data request from the telephonic server; and
send a wipe command from the network server to the mobile device.

10. The system of claim 9, wherein the voicemail system is hosted by a carrier or service provider.

11. The system of claim 9, wherein the voicemail system is hosted by an enterprise.

12. The system of claim 9, wherein the network server is a device server hosted by a carrier or service provider.

13. The system of claim 9, wherein the network server is an enterprise server.

14. The system of claim 9, wherein the telephonic server is accessed utilizing a telephone number for the mobile device.

15. The system of claim 9, wherein the telephonic server is accessed utilizing a telephone number associated with a user of the mobile device.

16. The system of claim 15, wherein the telephone number associated with the user of the mobile device is an enterprise telephone number, and wherein the telephonic server is a private branch exchange of the enterprise.

17. A non-transitory computer-readable storage medium storing instructions that when executed by at least one processor cause the performance of operations comprising:
receiving, at a telephonic server hosting a voicemail system for a mobile device, a selection to wipe data and connections from the mobile device, the voicemail system having a telephonic menu accessible by voice call utilizing a telephone number associated with the mobile device;
prompting, upon receiving the selection, entry of a password;
verifying a received password at the telephonic server; and
forwarding a wipe data request to a network server to send a wipe command, the network server being distinct from the telephonic server and having a trust relationship with the telephonic server to authenticate the wipe data request.

18. The non-transitory computer-readable storage medium of claim 17, wherein the voicemail system is hosted by a carrier, a service provider or an enterprise.

19. The non-transitory computer-readable storage medium of claim 17, wherein the network server comprises a device server hosted by a carrier or service provider.

20. The non-transitory computer-readable storage medium of claim 17, wherein the network server comprises an enterprise server.

21. The non-transitory computer-readable storage medium of claim 17, wherein the telephonic server is accessed utilizing a telephone number for the mobile device.

22. The non-transitory computer-readable storage medium of claim 17, wherein the telephonic server is accessed utilizing a telephone number associated with a user of the mobile device.

* * * * *